Feb. 24, 1970   E. LANGBERG ET AL   3,497,610
AUTOMATIC MARKER PRODUCTION SYSTEM UTILIZING
ELECTRO-OPTICAL SCANNING MEANS
Filed Sept. 26, 1966   14 Sheets-Sheet 1

INVENTORS
Edwin Langberg
and
Antal Hartai
BY
Robert E. Corb
ATTORNEY

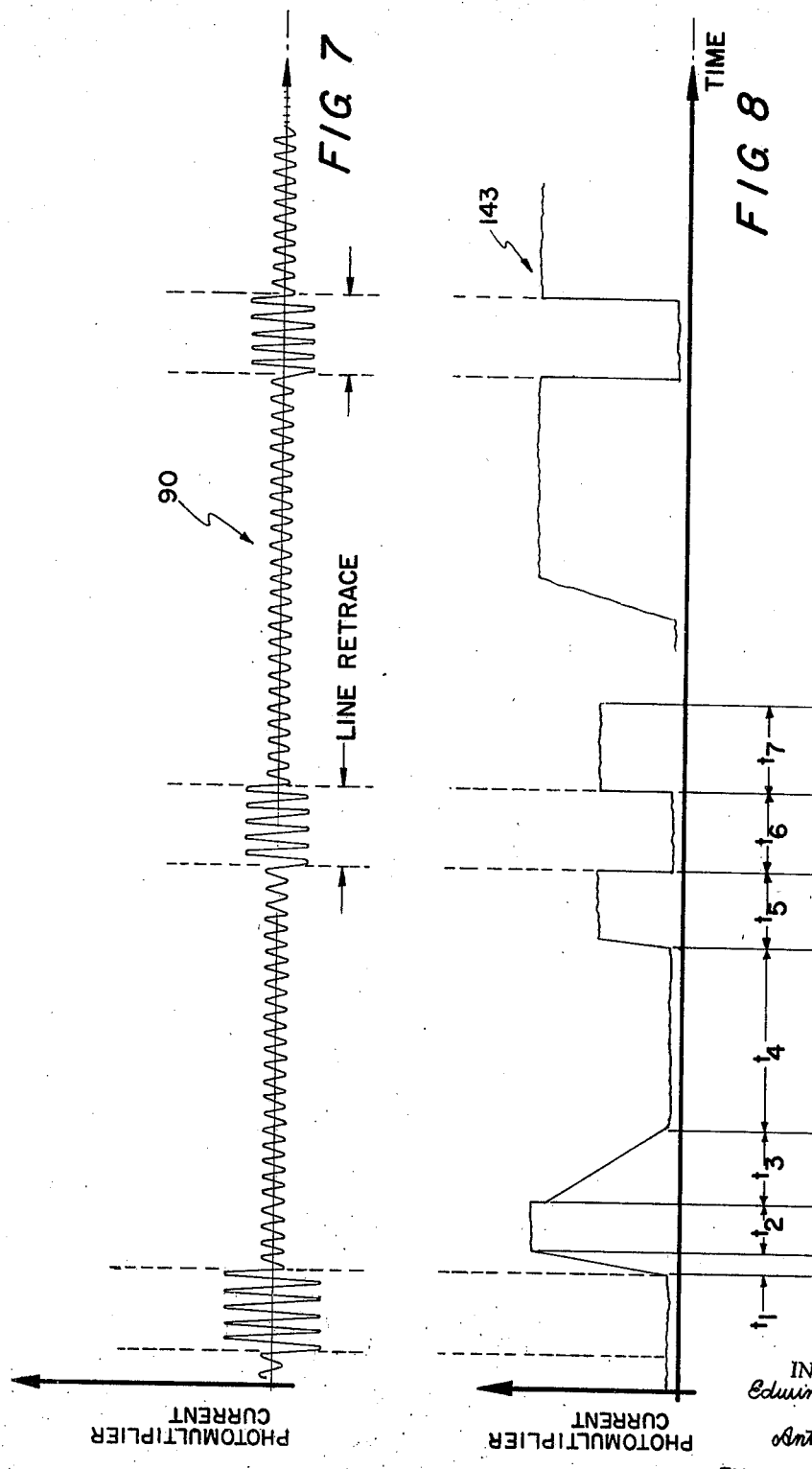

Feb. 24, 1970 E. LANGBERG ET AL 3,497,610
AUTOMATIC MARKER PRODUCTION SYSTEM UTILIZING
ELECTRO-OPTICAL SCANNING MEANS
Filed Sept. 26, 1966 14 Sheets-Sheet 8

INVENTORS
EDWIN LANGBERG
ANTAL HARTAI
BY
ATTORNEY

INVENTORS
EDWIN LANGBERG
ANTAL HARTAI
BY
ATTORNEY

United States Patent Office 3,497,610
Patented Feb. 24, 1970

3,497,610
AUTOMATIC MARKER PRODUCTION SYSTEM UTILIZING ELECTRO-OPTICAL SCANNING MEANS
Edwin Langberg, Lexington, and Antal Hartai, Littleton, Mass., assignors, by mesne assignments, to New England Merchants National Bank of Boston
Continuation-in-part of application Ser. No. 557,757, June 15, 1966. This application Sept. 26, 1966, Ser. No. 598,534
Int. Cl. H04n 1/22
U.S. Cl. 178—6.6                                3 Claims

ABSTRACT OF THE DISCLOSURE

An automatic marker production system having electro-optical means for scanning an arrangement of miniature pattern pieces and means for distributing the signals produced by the scanner to a printer which prints full-size patterns on a web of paper or cloth.

---

This application is a continuation-in-part of application Ser. No. 557,757, filed June 15, 1966 in the name of Edwin Langberg et al., and now abandoned.

This invention relates to a system for making markers of the type carrying a plurality of patterns arranged to serve as guides in the cutting of sheet materials, and more particularly, to a system for automatically producing full-size markers from miniature markers.

In a number of industries, such as the garment industry, involving the assembly of sheet materials such as fabrics into a completed product such as a garment, a basic step is the cutting of the sheet material according to patterns. In the garment industry, the fabric to be cut is first marked with an outline of the patterns arranged to achieve the most efficient utilization of the fabric and this arrangement of cutting patterns on a fabric have come to be known as a "marker." In the past, it has been the practice to arrange patterns on the fabric or other sheet material and manually trace the outlines of the pattern. Full size patterns are difficult to lay out and cumbersome to work with, and manually tracing patterns to form markers is not only slow and costly, but is subject to inaccuracies frequently resulting in waste of fabrics. Miniature markers made up of miniature patterns are frequently employed as an aid in achieving the most efficient layout because of the convenience in handling of the miniature patterns.

An object of the invention is to provide an automatic fabric marker production system capable of producing full-sized markers from miniaturized markers more rapidly, accurately and at lower cost than has been achieved in the past.

Other objects of the invention are: to provide an automatic fabric marker production system including an electro-optical scanning unit for scanning a miniaturized marker and a printing unit responsive to an output from the scanning unit for accurately producing markers having a predetermined magnification; and to provide means for accurately synchronizing the operation of said scanning and printing units to provide for operation of said units at separate locations or in conjunction with one another.

A further object of the invention is to provide in an automatic fabric marker production system, means responsive to an electro-optical scanning unit for producing an output signal modulated in accordance with the boundary between a scanned miniature pattern and a contrasting surround, and high speed distributing means responsive to the modulated signal for effecting a selective actuation of printing devices in a printing unit in accordance with said signals and for a predetermined minimum energization interval.

Still another object of the invention is to provide in a printing unit for printing upon a traveling web, means for continually monitoring the instantaneous speed of the web and further means for maintaining a predetermined relationship between the operation of said scanning unit and the movement of said web relative to said printing means.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein:

FIG. 7 is a diagrammatic representation of an electrical synchronization signal generated by the structure of FIGS. 1 through 5 in accordance with one aspect of the invention;

FIG. 8 is a diagrammatic representation of an electrical signal generated by the structure of FIGS. 1 through 5 in accordance with another aspect of the invention;

Figure 17:
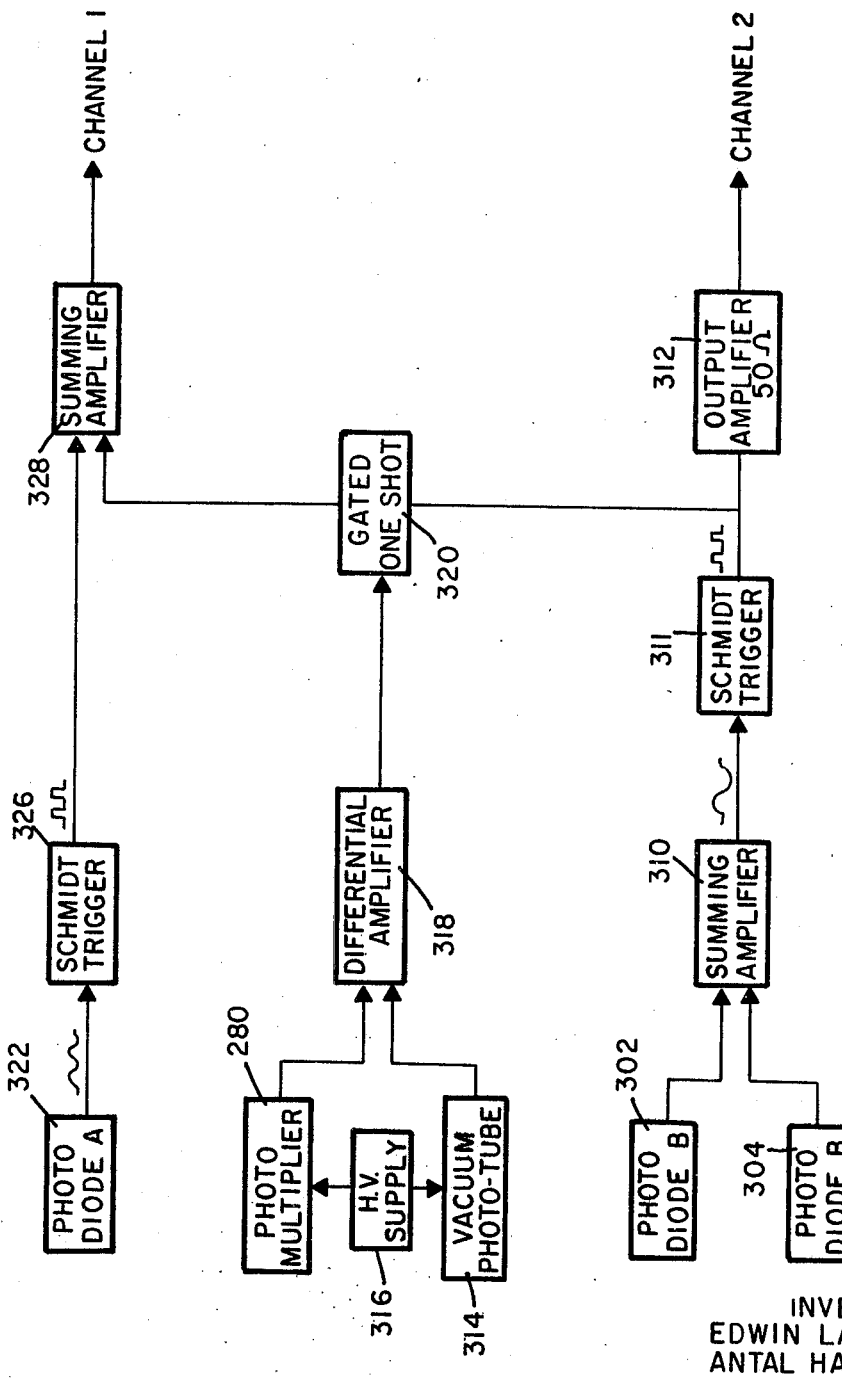
FIG. 17 is a block diagram of electronic circuitry which may be employed in the scanning apparatus of FIGS. 13 through 15 to convert the optical pick-up of the scanning apparatus into an electrical output.
Figure 18:
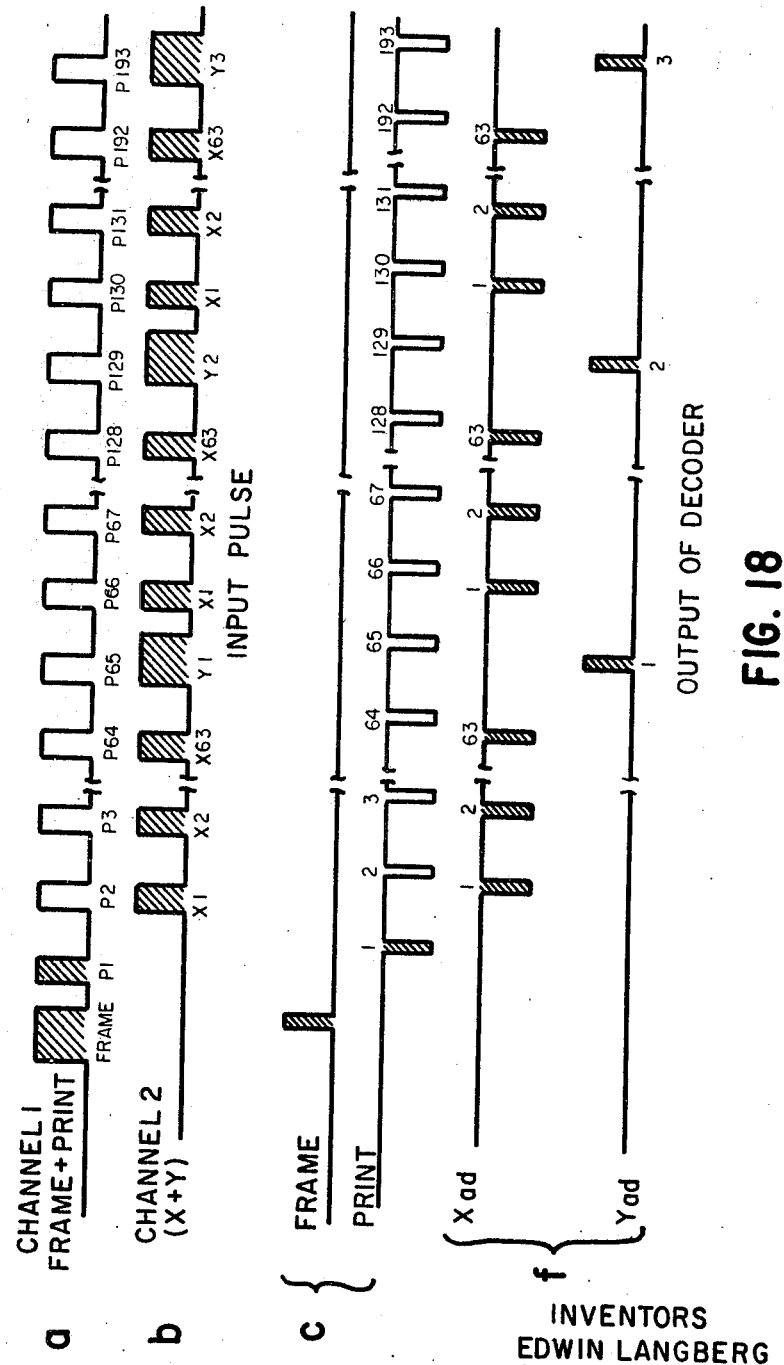
FIGS. 18a and 18b are diagrammatic representations of electrical signals which might be produced at the output of the scanning apparatus of FIGS. 13 through 16.
Figure 19:
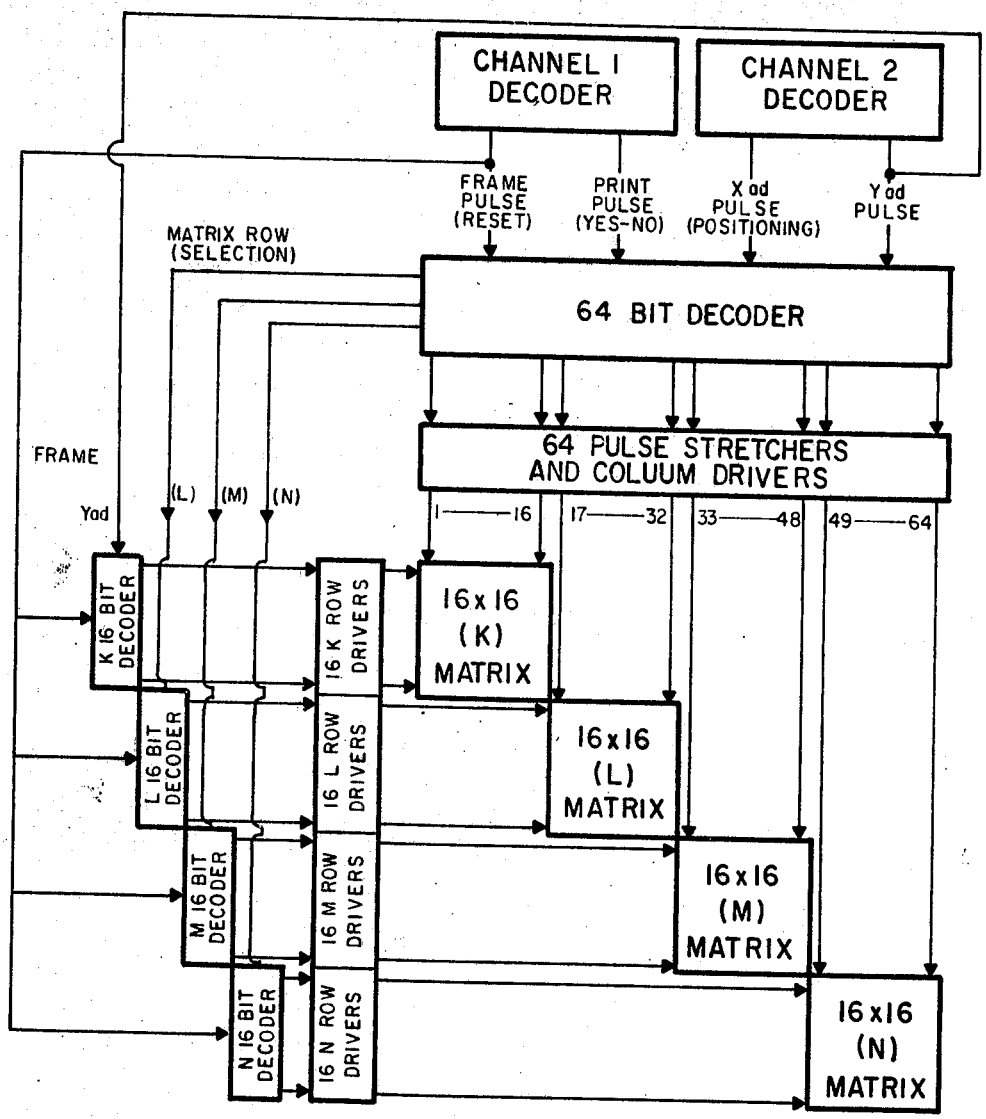

FIGS. 18c through 18f are diagrammatic representations of the electrical signals shown in FIGS. 18a and 18b after having been processed through decoding means; and FIG. 19 is a diagrammatic representation of pulse distributing means which may be constructed in accordance with the invention for use with the embodiment depicted in FIGS. 13 through 18.

The drawings reveal two structural implementations of the invention. Referring particularly to the embodiment illustrated in FIGS. 1 through 6, very briefly, an automatic fabric marker production system embodying the inventive concepts may comprise a scanning unit 12 for scanning miniature master patterns 13 comprising a miniature marker 14. The miniature marker 14 comprises miniature patterns arranged upon a planning or layout table 16 having grid lines 17 to assist in the arrangement of patterns 13. The surface of table 16 upon which patterns 13 are arranged has light absorptive properties, i.e., reflectivity, different from that of the patterns 13 to create a contrast therebetween, for reasons which will become evident hereinafter.

A printing unit 18 is provided, being responsive to scanning unit 12 for printing on a traveling marker web 20, a marker 19 comprising enlarged, full-size outlines geometrically similar to the boundaries of patterns 14 and arranged in a corresponding manner.

Referring particularly to FIGS. 1 through 5, the scanning unit 12 in the FIGS. 1 through 5 embodiment is supported over the planning table 16 by a traveling tubular frame 21 and is adjustably mounted for transverse positioning over the planning table 16 by means of a guide member 22 supported by frame end pieces 23, 24, and suitable means such as a set screw 26 is provided for locking the scanning unit 12 in the desired transverse position over the planning table 16.

In order that the scanning unit 12 may scan the miniature marker 14, means must be provided for driving the scanning unit 12 longitudinally over the miniature marker 14. To this end the frame 21 may be provided with sets of rollers 27a, 27b and 27c at each end of frame 21. A stepping or synchronous motor 28 is illustrated as providing a source of power for driving a chain 29 through a driven sprocket 30. The chain 29 is directly connected to the frame 21 carrying the scanning unit 12.

The scanning unit 12 includes an optical system for effecting a line-by-line spot scan of the miniature marker 14 and electronic transducing means including a photoresponsive device, such as a photomultiplier tube 32, for translating an optical input from an optical scanning aperture into an electrical output modulated in accordance with the optical input thereto.

The optical system for effecting a spot scan of the exemplary miniature marker 14 includes a light source, which may, for example, be a fluorescent lamp 34, supported adjacent the marker 14 for brightly illuminating a narrow area 36 thereof. A light conduit 38 transmits light reflected from miniature marker 14 through an aperture slit 40 to a totally reflective surface 42 of a prism 44. Prism 44 reflects the light path 90° to a totally reflective surface 46 of a second prism 48 which in turn reflects the light path 90° through a conventional objective lens 50. The lens 50 serves to focus a narrow, radially oriented image of the slit 40 in the region of an opaque scanning disc 52 and immediately over and in registration with a slit 54, arranged parallel with slit 40, in a scanned mask 56. Light transmitted through the aperture defined by the scanning disc 52 and slit 54 in scanned mask 56 is conducted through conventional light guide means 58, which may comprise a converging bundle of optical fibers, to the photomultiplier tube 32.

As is evident from the above description, as the scanning unit 12 is moved longitudinally along the planning board 16, the described optical system, including lamp 34, slit 40, prisms 44 and 48 and lens element 50 is capable of producing an optical line scan of the miniature marker 14.

In order that an optical spot scan of marker 14 may be produced, a synchronous or stepping motor is provided for rotating scanning disc 52, which, in turn, is provided with a segmented spiral arrangement of regions 60 of restricted width transmissive to light actinic to photomultiplier tube 32. The regions 60 are designed to span equal angular sectors of the disc 52. In the illustrated embodiment, for reasons which will become apparent hereinafter, twenty-four regions 60 have been shown spanning twenty-four equal sectors of the disc 52. The regions 60 are designed to have an equal radial displacement per degree of rotation of disc 52.

Input pulses controlling both the disc driving stepping or synchronous motor 62 and the stepping or synchronous motor 28 for driving the frame 21 supporting the scanning unit 12 are supplied in synchronization from an external source of electrical power.

Assuming that disc 52 is driven in the clockwise direction (in FIGS. 4 and 5), the scanning slit 54 in mask 56 is scanned radially outward by the spirally oriented scanning regions 60 once per revolution of disc 52. The leading end 66 of each of the light-transmissive scanning regions 60 lies on the same radius as the trailing end 68 of the preceding region 60 on disc 52. Thus, as disc 52 is rotated, no radial interruptions are imposed in the scan of slit 54 due to the bridge portions 64 of disc 52 between each of the regions 60. It is manifest that the light transmitted through light guide means 58 to the photomultiplier tube 32 represents a line-by-line spot scan in the longitudinal direction of marker 14. Thus, the current output of the tube 32 varies in direct relation to the average intensity of the light reflected from the miniature marker 14 at any instantaneous position of the scanned spot.

Figure 1:
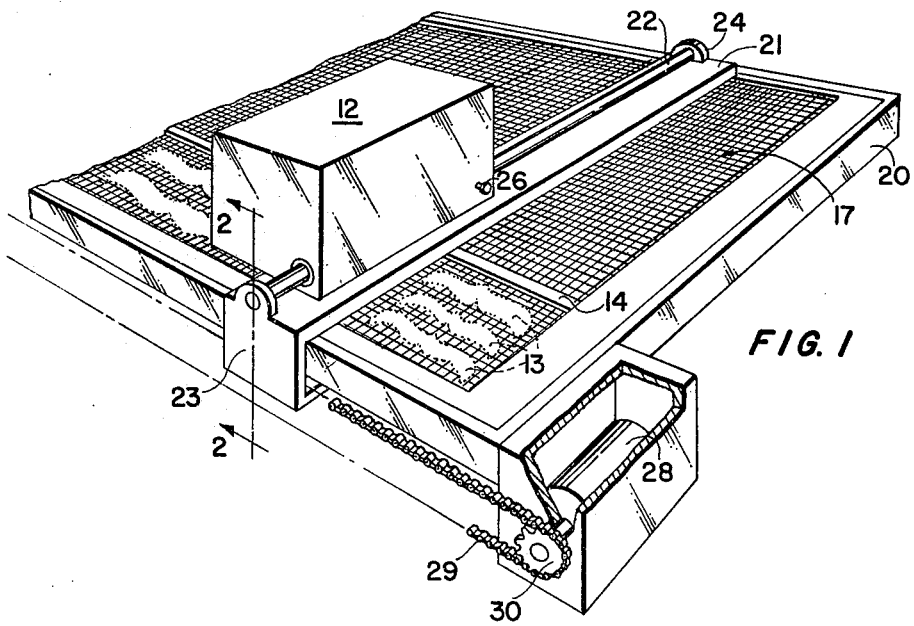
FIGURE 1 shows in a perspective view an exemplary embodiment of electro-optical scanning apparatus constructed in accordance with the invention.
Figure 2:
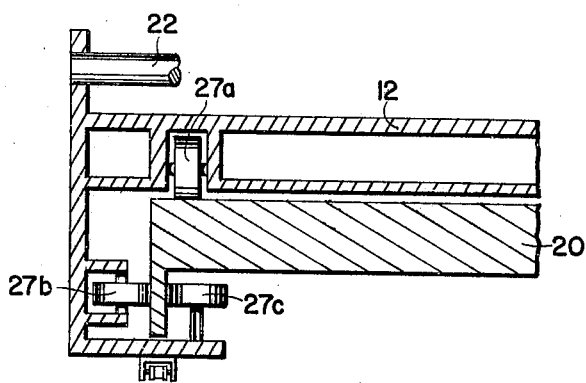
FIG. 2 is a sectional view taken along lines 2—2 of FIGURE 1.
Figure 3:
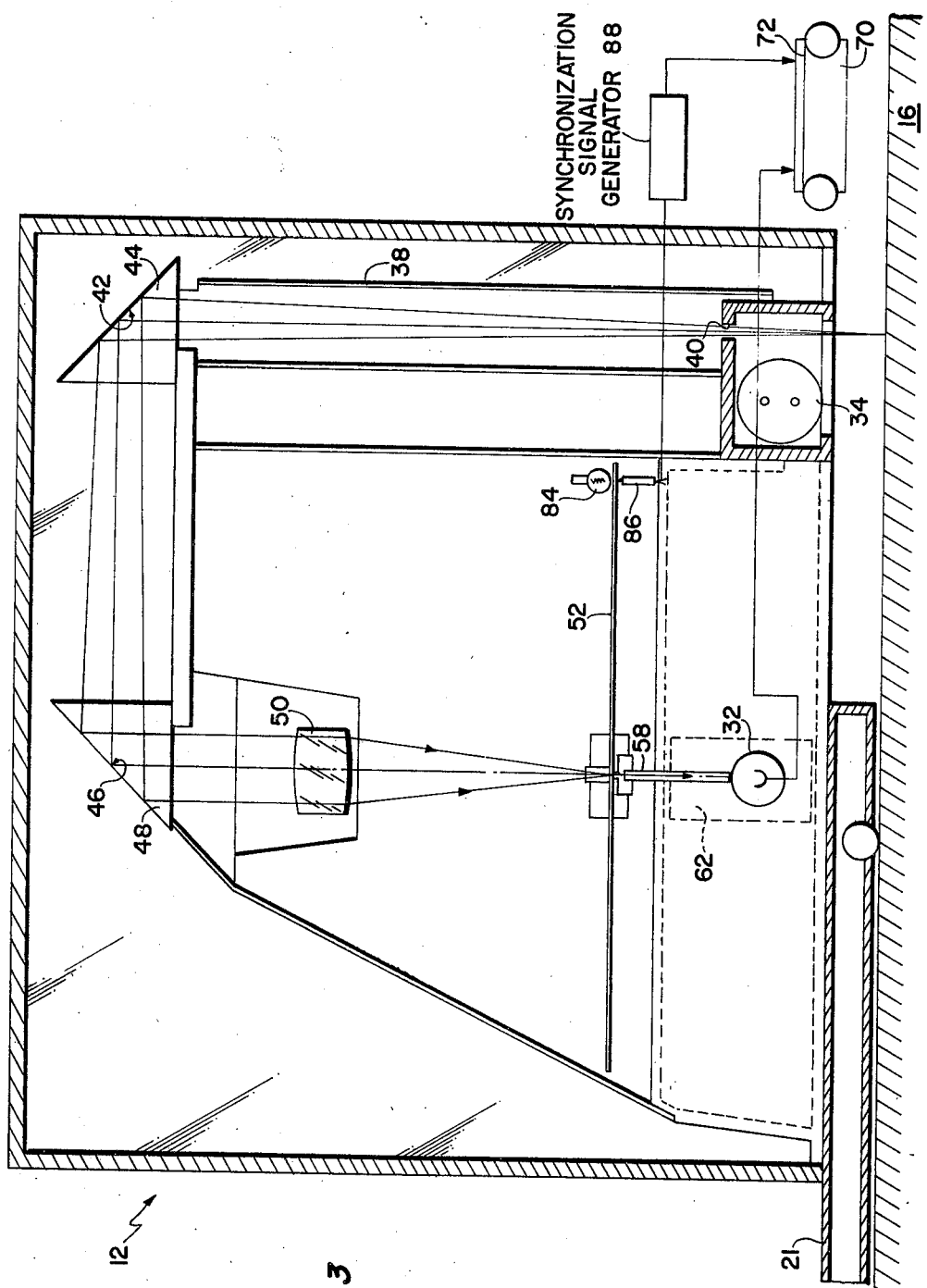
FIG. 3 is an elevational view of the scanning apparatus of FIGS. 1 and 2, certain portions thereof having been removed for clarity of illustration.

The output of the photomultiplier tube 32 may be utilized in any of a number of ways. It may be fed through a direct connection to the printing unit 18. Alternatively, the output signal may be amplified and, after imposition upon a carrier, may be transmitted to a receiver at a distant printing unit. In a preferred arrangement, the signal may be fed to a tape recorder 70 and stored, for example, on two-channel magnetic tape 72, as shown in FIG. 3. The second channel of the tape 72 would be used, in such an arrangement, to store a synchronization signal, as explained below, for synchronizing the operation of the printing unit 18 with the operation of the scanning unit 12.

Figure 4:
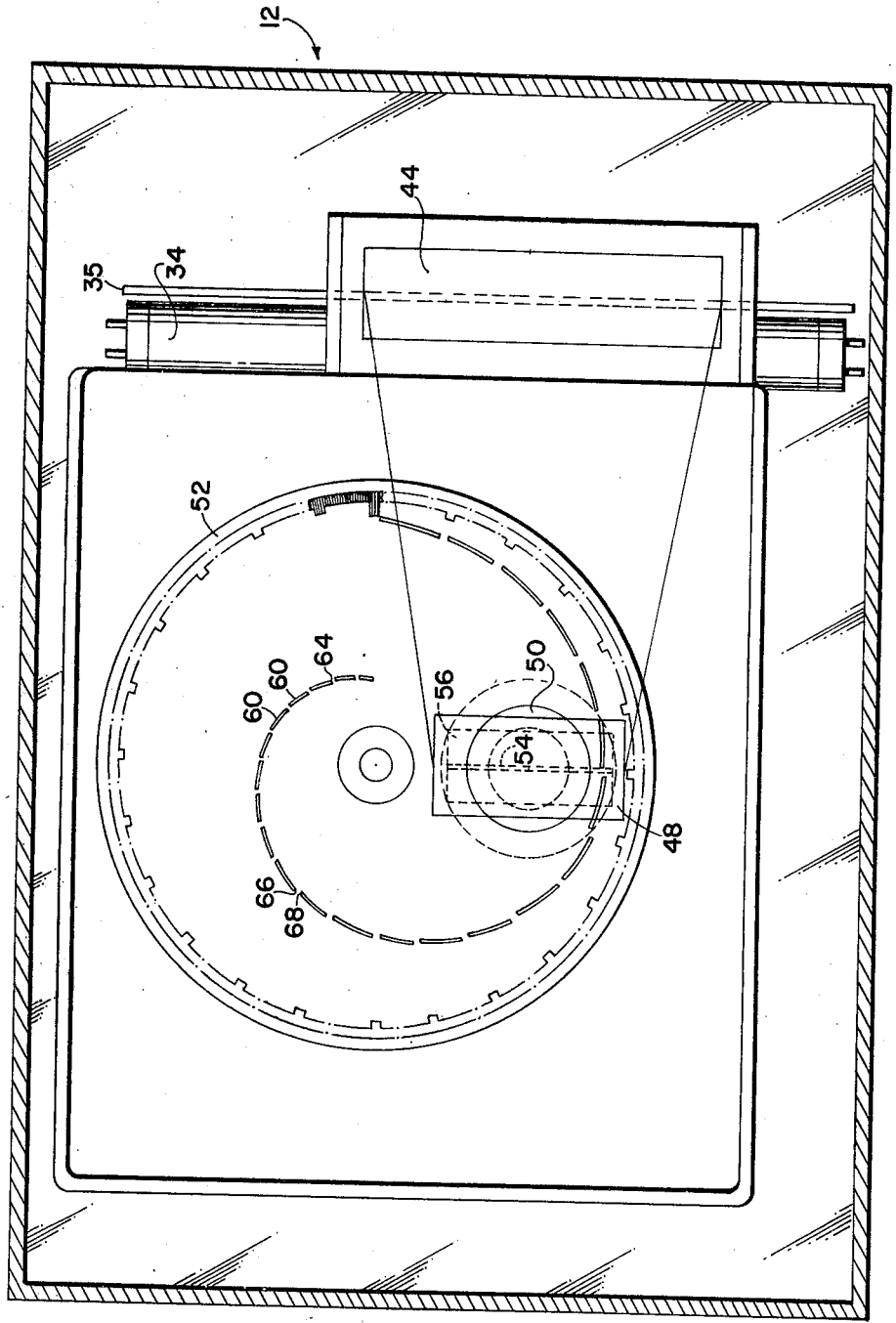
FIG. 4 is a plan view of the scanning apparatus of FIGS. 1 through 3, certain elements having been omitted in the interest of clarity.
Figure 5:
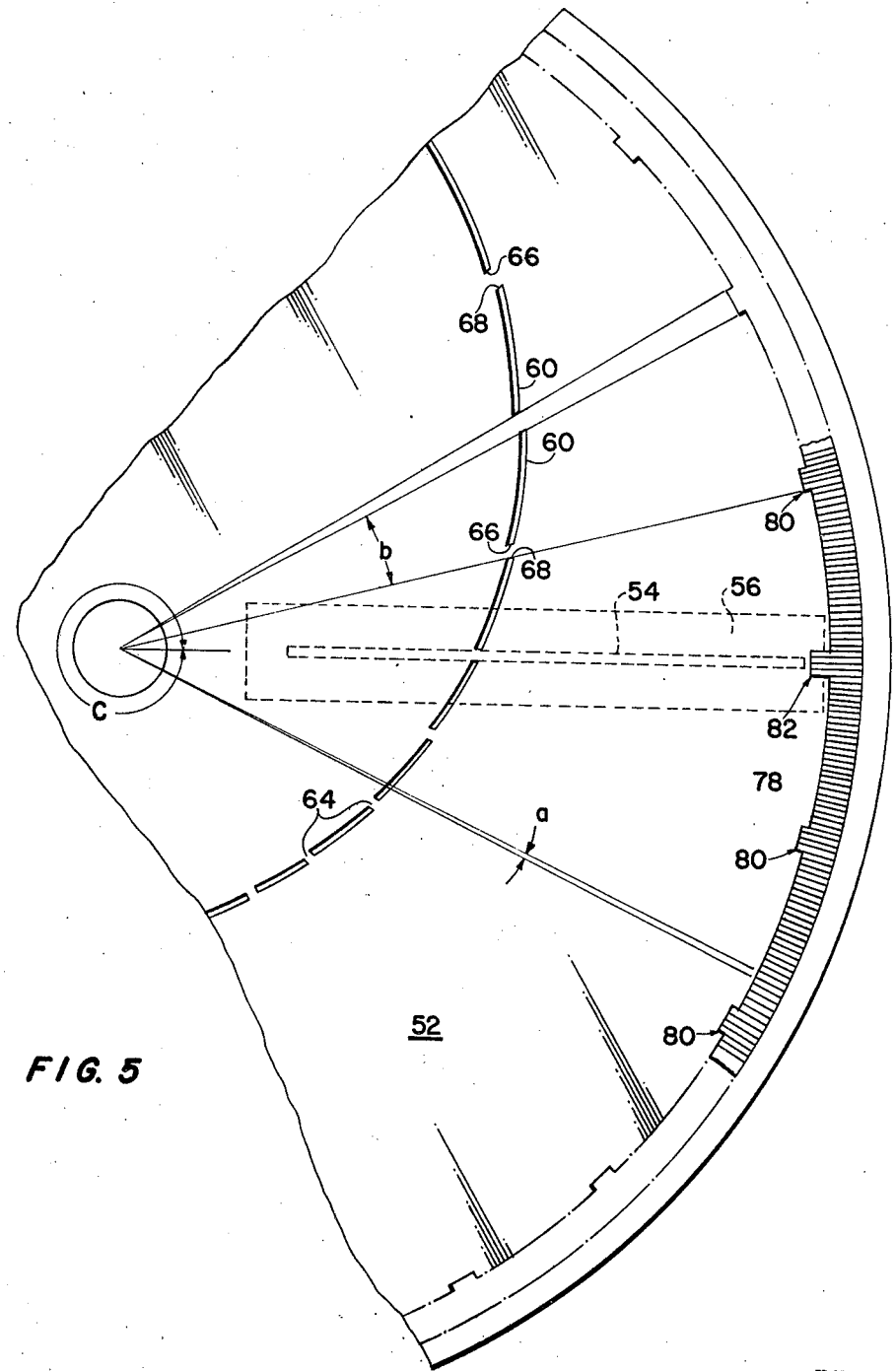
FIG. 5 is an enlarged view of a portion of the scanning apparatus revealed in FIG. 4.

The means for generating such a synchronization signal for synchronizing the printing unit 18 with the scanning unit 12 may be best understood by referring to FIGS. 3 through 5. The scanning disc 52 is provided near the periphery thereof with light-transmissive regions in the form of slits 78 evenly spaced by an angle $a$. A number of the slits 78 have radial extensions 80 at regular angular intervals, defined herein by angle $b$. At a third regular angular interval, defined by angle $c$, a number of the radially extended slits are extended further, as shown as 82. A light source such as a lamp 84 is disposed on one side of the disc 52 and a photoresponsive means such as a photoconductive cell 86 is disposed on the opposite side of the disc 52 in registration with slits 78.

In operation, as the disc 52 is rotated by the stepping or synchronous motor 62, the slits 78 in the disc 52 act as an optical chopper, intermittently breaking the light path through the disc 52 from lamp 84 to photoconductive cell 86. As the slit 78 having the first radial extensions 80 intersect the light path from lamp 84 to cell 86, a greater light transmissive area is presented to the light path, allowing more light to pass to the cell 86. Similarly, the second radial extensions 82 spaced at angle $c$ periodically allows an even greater quanta of light to traverse the disc 52 and impinge upon call 86. Thus, as the disc 52 is rotated at a constant average angular velocity, the resistance of photoconductive cell 86 is amplitude modulated at a frequency inversely related to angle $a$, the angular separation between slits 78.

Assuming the cell 86 to be placed as a passive load element in a synchronization signal generator 88, the generator 88 produces a synchronization signal 90 having a waveform which may take the shape shown in FIG. 7.

Means have been shown for producing a synchronization signal which utilizes the disc 52 as an encoder, thereby assuring accurate synchronization of the operation of the scanning and printing units 12, 18. It is evident that other arrangements might be devised for producing a synchronization signal modulated with a periodicity corresponding to the angular velocity, and hence the scanning speed, of the scanning disc 52. The manner in which the synchronization signal 90 so produced is used will be described hereinafter.

Figure 6:
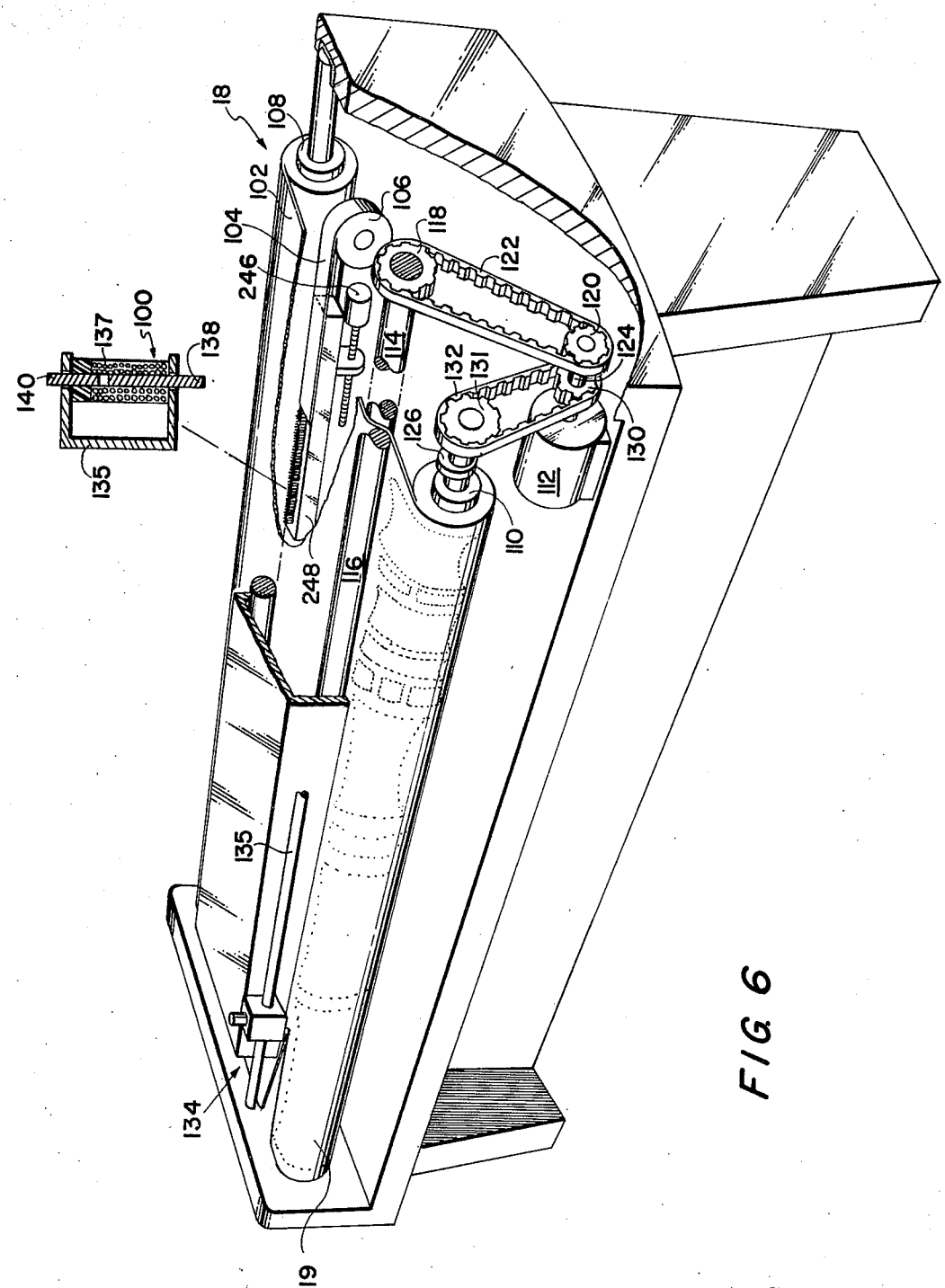
FIG. 6 is a perspective view partially broken away of printing apparatus constructed in accordance with the invention for use with the scanning apparatus of FIGS. 1 through 5.

Referring now to FIG. 6, the printing unit 18 is illustrated as including a bank of linearly arranged printing devices 100 that are electrically controlled and may be energized mechanically, pneumatically, hydraulically, etc., for printing discrete visible marks upon a traveling marker web 102, which web 102 preferably comprises a paper material suitable for receiving ink from an inked ribbon 104 supplied from a ribbon storage reel 106.

The traveling web 102 is fed from a supply roll 108 to a take-up roll 110 by a drive motor 112 driving a web drive roll 114 acting against a pressure roll 116.

The drive roll 114 may be driven, as illustrated, by drive motor 112 and is coupled with the drive motor through a transmission including sprockets 118, 120, and a timing belt 122. The take-up roll 110 may be over-driven from a drive shaft 124 of motor 112 through a transmission including a slip clutch 126 and sprockets 130, 131 interconnected by a belt 132.

A cutter 132 slidably mounted on a guide bar 135 is provided for severing marker 19 from the remainder of the web 102.

The printing devices 100 are current controlled and in the form shown comprise frames 135 supporting solenoids 136 each having a coil 137 effective, when energized, to drive an armature 138 against a printing head 140 to impel head 140 against inked ribbon 104. The impact of printing head 140 against ribbon 104 produces a discrete visible mark upon the traveling web 102. The web 102 is backed by a platen roll 142.

The spacing of the printing devices 100 across the web 102 controls the degree of transverse magnification of the miniature marker 14. The longitudinal magnification of the miniature marker 14 is determined by the linear speed at which the web 102 is driven. By way of example, if the scanning unit 12 is driven over the miniature marker 14 at one foot per minute and the linear speed of the driven web is five feet per minute, a fivefold longitudinal magnification of the miniature marker 14 in the longitudinal direction will be produced. In the transverse dimension, if the printing units 100 are distributed across six feet of web 102 and the area 36 on miniature marker 14 scanned by the scanning unit 12 is fourteen and four-tenths inches, the transverse magnification will also equal five. By varying the aforedescribed parameters, a range of magnification factors can be achieved.

The printing unit 18 may include, for example, ten printing devices per inch to produce a high resolution outline on the web 24 of the scanned miniature master patterns 13 of miniature marker 14.

As suggested briefly above, the photomultiplier tube 32 may comprise an element of transducing means for translating the optical output of the scanning unit 12 into an electrical signal modulated in accordance with the said optical output. The invention is most advantageously practiced utilizing miniature master patterns 13 formed of a material having a high diffuse reflectivity (e.g., white) for light actinic to the photomultiplier tube 32 and disposed on a miniature marker 14 background of low reflectivity (e.g., black) for light actinic to the photomultiplier tube 32 in order that a scan of a pattern boundary against a contrasting surround will represent a substantial change of reflectivity of the scanned area. The rate at which the diffuse reflectivity varies as a boundary is scanned increases directly as the angle of intersection with a boundary approaches 90°.

The nature of the current output signal from the photomultiplier tube 32 in response to the optical input thereto from the optical scanning system may be better understood by referring to FIG. 8 wherein a typical wave form of the signal 143 is shown. Time interval $t_1$ shows a very rapid transition of the scanned spot from the low reflectivity background of the miniature marker 14 across the boundary of a miniature pattern 13 on the marker 14. The steepness of the slope of the signal during this time indicates an intersection of the scanned line with the pattern boundary at approximately 90°. Interval $t_2$ indicates a scan of a portion of one of the highly reflective miniature patterns 13. Interval $t_3$ indicates the departure of the scanned spot from the pattern being scanned to the dark surround. The slope of the signal here is more gentle than during interval $t_1$, indicating that the boundary was crossed obliquely in a greater period of time. Interval $t_4$ represents a scan of the low reflectivity background surround of marker 14. Intervals $t_5$ and $t_7$ represent a condition wherein the scanned spot is moving along a boundary in overlapping relationship with a pattern 13 and its surround. Interval $t_6$ represents a break in the boundary scan to allow for the generation of a synchronization signal, as will be described in more detail below. Note that during the interval $t_6$, a bridge portion 64 between scanning regions 60 on scanning disc 52 precludes light from reaching the photomultiplier tube 32.

In order to control the selective energizing of the printing devices 100 in accordance with the modulated output signal 143 from the photomultiplier tube 32, control means 144 are provided. In the illustrated embodiment wherein the photomultiplier tube signal 143 and synchronization signal 90 have been stored on tape 72, a tape readout device 145 is provided for extracting these signals from the tape 72.

Figure 9:
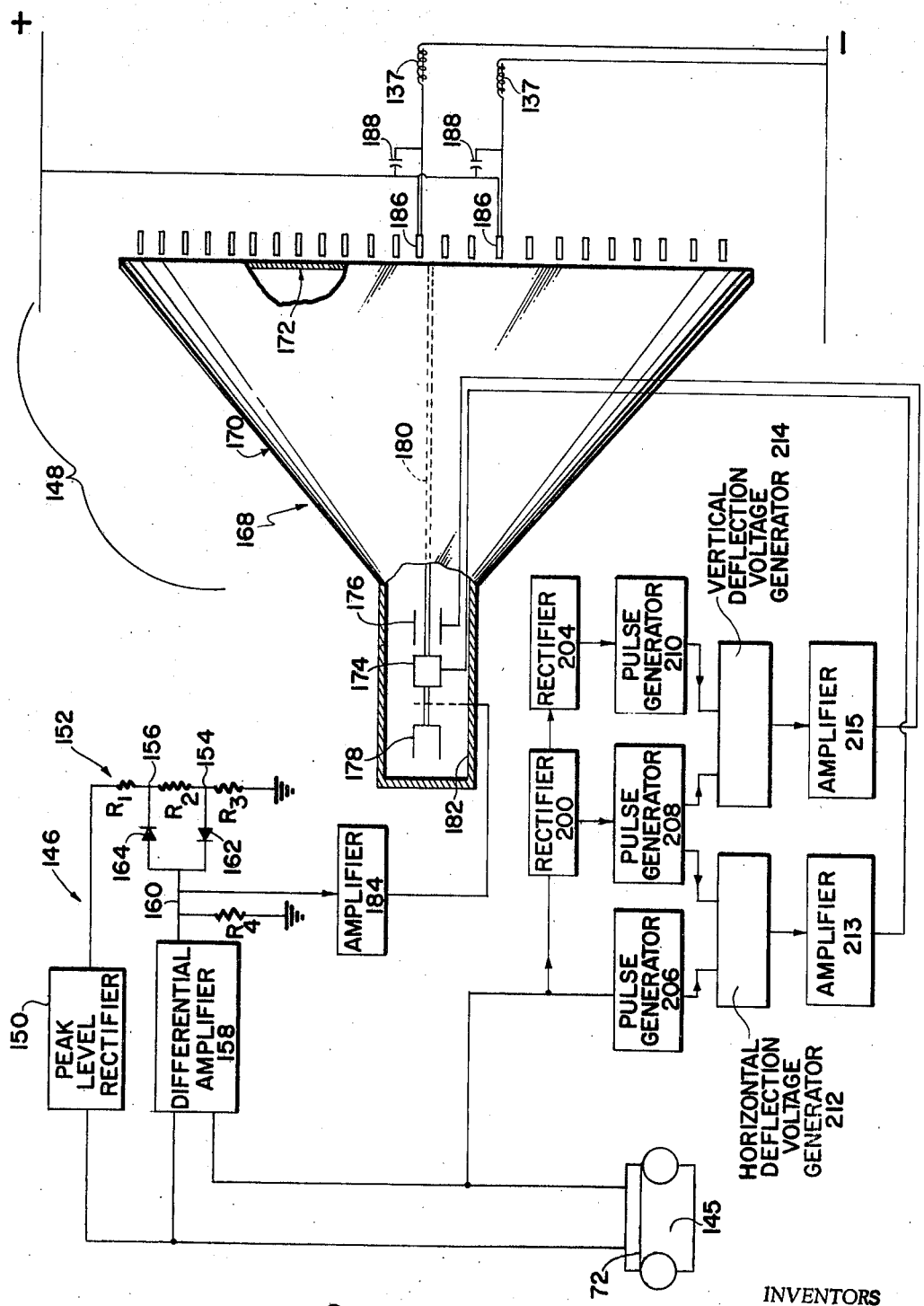
FIG. 9 is a schematic illustration of control means for controlling the energization of printing devices included in the printing apparatus of FIG. 6.

Referring to FIG. 9, the control means may comprise, broadly, gray level discriminating means 146 and an electronic distributor 148. The discriminating means 146 functions to generate a predetermined output only when the stored signal 143 from the photomultiplier tube 32 indicates a scan across a pattern-surround boundary or a scan parallel thereto. The distributor 148 acts to selectively control the energization of the printing devices 100 in accordance with the modulation of signal 143.

Referring to the waveform of signal 143 in FIG. 8, it will be seen that the conditions wherein a pattern-surround boundary is scanned parallel or obliquely are both represented by the production of an instantaneous voltage either passing rapidly through an intermediate range of voltages, for example, as during interval $t_1$, or dwelling in the intermediate range, as represented by intervals $t_5$ and $t_7$ in FIG. 8.

The discriminating means 146 detects the instantaneous signal voltages in a predetermined intermediate range of voltages, for example, the range of voltages between one-third peak voltage and two-thirds peak voltage.

As shown schematically in FIG. 8, the discriminating means 146 may comprise a peak level rectifier 150 for generating a D.C. voltage of a magnitude approximating the peak voltage of signal (white level) 143. The output from the peak level rectifier 150 is dropped through a voltage divider 152 comprising resistors $R_1$, $R_2$ and $R_3$. The resistors $R_1$, $R_2$ and $R_3$ may be equal in order that the voltage generated at terminals 154, 156 will represent one-third and two-thirds peak voltage, respectively.

The photomultiplier tube signal 143 and the synchronization signal 90 are both fed into a differential amplifier 158 which performs a summation of the signals and applies the combined signals at terminal 160 across a load resistor $R_4$. A pair of diodes 162, 164 are connected with opposite polarity between terminal 160 and the terminals 154, 156, respectively, of the voltage divider 152.

In operation, at signal voltages above two-thirds peak voltage ("white" level), load resistor $R_4$ is shunted by diode 164; at signal voltages below one-third peak voltage ("black" level), $R_4$ is shunted by diode 162. At signal voltages between one-third and two-thirds peak voltage ("gray" level) neither diode conducts, and a substantial output voltage is generated across $R_4$. The low level synchronization signal 90 superimposed upon the much larger photomultiplier tube signal 143 in the "gray" region creates the output across $R_4$.

The number of pulses transmitted through the level discriminator during the interval when an output of said predetermined "gray" level is present across $R_4$ is dependent upon the duration of the interval. Thus, when the scanned spot moves parallel to a pattern-surround boundary, a large number of regularly recurring pulses will be transmitted. Fewer will be transmitted as a result of a gradual oblique scan across a boundary. Very few, or only one, pulse will be transmitted if the scan is effected perpendicular to a pattern-surround boundary.

In this embodiment of the invention, the signal 143 generated by the photomultiplier tube has been described as being fed directly to tape recorder 70 and stored on tape. Alternatively, the signal may be first amplified and processed through discriminating means 146 and the output of the discriminating means stored on tape 72. With such an arrangement the processed signal read out of tape readout device 145 would be fed directly to the control grid 182 of CRT 168.

In order to effect a selective actuation of the printing devices 100 in accordance with the modulated pulsating output from the discriminating means 146, the distributor 148 is provided, located in the printing unit 18. In the embodiment illustrated in FIG. 9, the distributor 148 comprises a cathode ray tube 168 having an envelope 170, a screen 172 having a fluorescent phosphor coating, and horizontal and vertical deflection plates (or coils) 174, 176, respectively. Electrons emitted from cathode 178 of the cathode ray tube (CRT) are drawn to screen 172 due to a high voltage impressed thereon. The beam 180 of electrons flowing to the screen 172 is modulated by the synch pulses transmitted across $R_4$, after amplification by an amplifier 184, which is applied to control grid 182.

A matrix of photoresponsive devices such as photoconductive diodes 186 are arranged to address the raster on the CRT screen 172 such that the diode 186 will respond, by a marked drop in resistance, to illumination by light from an area on the raster exited to luminescence by the electron beam 180 and registered with the diode 186. The particular phosphor is selected to have a light output matching the sensitivity of the diodes. The respective areas on the screen raster may be isolated from each other by a mask which may be formed, for example, conventionally by photographic techniques.

Each diode 186 is connected in series with one of the solenoid coils 137 comprising part of a printing device 100. A source of potential is applied across the diode 186 and coil 137. Thus the energization of the phosphor on an area of screen 172 adjacent to a particular diode 186 results in the actuation of the printing device 100 connected to that diode 186. A capacitor 188 may be used to by-pass each of the diodes 186 to protect the diode from damage by transient high voltages which maye be induced in the respective coils 137.

As described above, each photoconductive diode 186 controls one of a large number of printing devices 100 linearly arranged in a transverse row across the marker web 102. Assuming a proper bias on the CRT 168, certain of the printing devices 100 will be actuated as the electron beam 180 is scanned across the screen raster. The particular printing devices 100 which are actuated is determined by the presence or absence of a pulse applied to control grid 182 as the beam 180 is scanned across the respectively associated area on the screen raster. As described above, the presence or absence of a pulse, at the control grid at a particular time is dependent upon the presence or absence of a synch pulse across $R_4$ at the output of the discriminating means 146 as a result of an optical "gray" scan along or across a pattern-surround boundary on miniature marker 14.

In order that the electron beam 180 may move between raster areas registered with a photoconductive diode 186 in discrete steps, a horizontal "staircase" or stepped deflection voltage is applied to the horizontal deflection plates (or coils) 174 and a similar, but lower frequency, vertical stepped deflection voltage is applied to the vertical deflection plates 176. The process and means by which the stepped horizontal and vertical deflection voltages are generated and synchronized with the optical scan by the scanning unit 12 and with the grid voltage signal may best be understood by reference to FIGS. 4, 5, 7 and 9.

The operation of the described embodiment of the invention may be clarified by the designation of exemplary dimensions in the system. The inventive concepts may be practiced in an exemplary system utilizing a web 102 having a useable width of sixty inches with six hundred printing devices 100 being aligned ten to the inch across the web 102. Accordingly, six hundred discrete areas are provided on the CRT screen raster arranged in twenty-four rows of twenty-five in each row. The six hundred printing devices 100 are controlled by an equal number of photoconductive diodes 186 respectively addressing areas on the raster of the screen 172.

Consonant with such an arrangement of photoconductive diodes 186, twenty-four spirally arranged scanning regions 60 on scanning disc 52 each span an angle of slightly less than 15°. As will become evident below, the angular bridges 64 between the regions 60 provide time for line retrace intervals required in the operation of CRT 168. It is evident that as each of the twenty-four spirally oriented regions 60 on disc 52 traverse slit 54, the photomultiplier tube receives information as to the reflectivity of twenty-five scanned spots on the miniature marker 14.

In a preferred arrangement, seven hundred and twenty slits 78 in scanning disc 52 each spaced by 15' and a disc angular velocity of ten revolutions per second provide a 7.2 kilocycle output signal of a first amplitude level from synchronization signal generator 88. An angular separation of 15° of the sets of five slits 78 having first radial extensions 80 provide a 240 cycle output at a second, greater amplitude level. A single set of five slits 78 having second radial extensions 82 provides a 10 cycle output at a third amplitude level greater than either of the 7.2 kc. or 240 cycle output.

It will be noted that of the seven hundred and twenty pulses generated by synchronization signal generator 88 during each revolution of the disc 52, six hundred are used to control the bias of control grid 182 of CRT 168, and thus the reflective energization of the printing devices 100. The remaining one hundred and twenty pulses, representing the sum of twenty-four sets of five pulses in each set, occur during the line retrace intervals during the scan of the CRT raster.

Referring especially to FIG. 9, to generate the horizontal and vertical deflection voltages, the synchronization signal 90 read out from a tape readout device 145 is applied to a first rectifier 200 for detecting the 240 cycle output and a second rectifier 204 for detecting the 10 cycle output. The 7.2 kc. pulse, the 240 cycle output from rectifier 200, and the 10 cycle output from rectifier 204 are applied to pulse generators 206, 208, and 210, respectively. A 7.2 kc. pulsed output from pulse generator 206 is applied to a "staircase" or stepped horizontal deflection voltage generator 212 and then amplified in amplifier 213. A 240 cycle pulse from pulse generator 208 is fed to the horizontal deflection voltage generator 212 to synchronize the line retrace Similarly, the 240 cycle pulsed output from pulse generator 208 is fed to a vertical deflection voltage generator 214 and then to an amplifier 215 to control the vertical scan rate of the electron beam 180. The 10 cycle pulsed output from pulse generator 210 is fed to the vertical deflection voltage generator 214 to synchronize the raster retrace.

With the system as described the deflection voltages applied to the deflection plates 174, 176 effect a spot-by-spot scan of the CRT raster.

The illustrated CRT 168 has been shown as employing a conventional unidirectional line scan with retrace intervals separating the successive line scan intervals. As an alternate arrangement the CRT screen raster might be scanned continuously in an alternately reversing scan pattern assembling a square wave. In such an arrangement no provision would have to be made for means to generate the line retrace signal or for adjustments in the system to account for the line retrace signal or the line retrace interval. Of course, the system would have to be modified in certain respects, for example, to adjust for the elimination of the line retrace.

In order to obviate the need for generating high current surges through the solenoid coils 137 to actuate the respective printing devices 100, a fluorescent material is selected for the screen coating which comprises phosphors having a relatively long persistence after excitation thereof. The cumulative effect of the persistence of the screen phosphors and the protracted decay of the photo-conductivity of photoconductive diodes 186 produces a minimum energization interval of the coil 137 which is sufficiently long to effect an actuation of the printing devices 100 at moderate applied current levels. In the described embodiment, the phosphor persistence period and the photoconductivity decay period of the diodes preferably are matched to the reaction time of the printing solenoids at the desired actuating current level. By way of example, the photoconductive decay and persistence periods may extend to 20 milliseconds, the interval during which the solenoids are energized, despite an excitation time of a particular raster area of only 0.1 millisecond.

Figure 10:
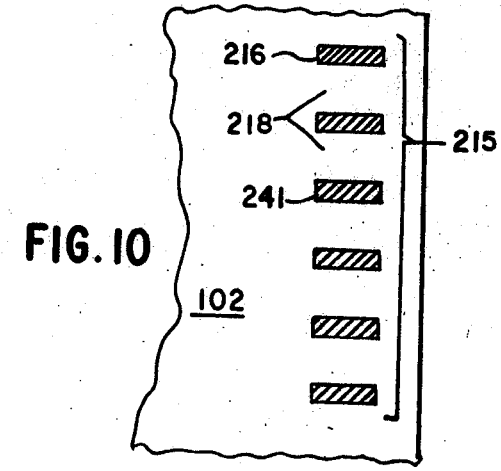
FIG. 10 shows a fragmentary portion of a marker web printed by the apparatus of the invention.
Figure 11:
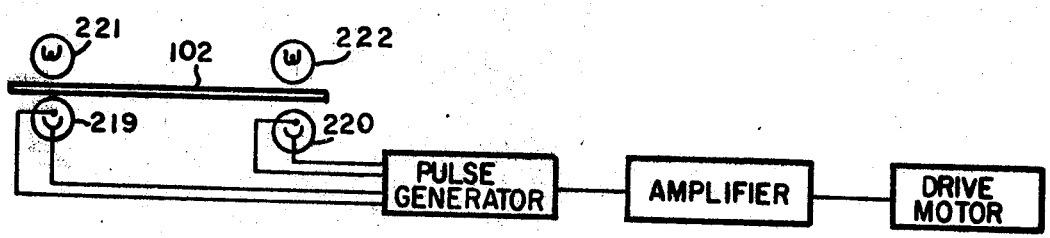
FIG. 11 is a schematic representation of web speed control and synchronizing means.

The natural elasticity and stretching of the marker web 102 due to tension applied during travel through the printer and expansion and shrinkage due to changes in moisture content, make it necessary, for optimum performance of the described system, to provide means for synchronizing the speed of the portion of the marker web 102 being printed, as determined by the speed of drive roll 114, with the optical scanning rate produced by the scanning unit 12. Numerous arrangements may be devised for accomplishing such a synchronization of the scanning rate with the linear web speed. One arrangement is illustrated schematically in FIGS. 10 and 11. The web 102 may include a strip 215 printed parallel to an edge of the web 102.

In a preferred arrangement the first solenoid-actuated printing device 100 is specially adapted to print strip 215 and has no other function. The strip 215 includes regularly recurring inked areas 216 spaced by areas 218 of the web 102. A pair of photoresponsive devices such as photocells 219 and 220 are spaced in the direction of movement of web 102 by a distance equal to a number of nominal distances apart. A source or sources of luminous energy, such as lamps 221, 222 may be provided on the opposite side of web 102 in registration with the strip 215 and photocells 219, 220, respectively.

In a preferred arrangement, the output of photocells 219, 220 is fed into a pulse generator 223 constructed and arranged such that a sudden change in the photic excitation of photocell 219 as an inked area 216 occludes lamp 221, establishes a D.C. voltage at a level above a reference level at the output thereof. The generator has the characteristic that a sudden change in photic excitation of photocell 220 as an inked area 216 occludes lamp 222 is effective to clamp the generator output voltage at the reference level. With this arrangement, as web 102 is driven past the photocells 219 and 220, a series of pulses is produced at the output of pulse generator 223, the width of each of which depends on the difference between the actual speed of the web and a nominal desired speed.

The pulsating output of generator 223 is fed to an integrating amplifier 224 which produces a voltage output, the magnitude of which output is proportional to the average D.C. value of the pulses (and thus to the average width of the pulses). The output of amplifier 224 preferably controls a shunt-connected D.C. motor, such as is shown at 112 in FIG. 6, for driving the web 102. If an average D.C. voltage above or below a nominal value is produced at the output of amplifier 224 (corresponding to a pulse width greater or less than a nominal width) the motor 112 receives a current tending to compensate for the detected aberration in the speed of web 102.

The strip 215 printed upon web 102 by the first printing device 100 serves an important additional function of providing a reference line for registering the edge of the markers formed on web 102.

Figure 12:
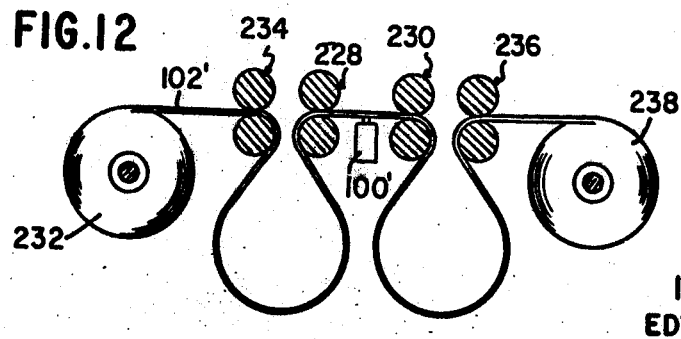
FIG. 12 is a schematic view of an alternative embodiment of one aspect of the invention.

FIG. 12 reveals an alternative drive arrangement which might be advantageously utilized in connection with such a web speed synchronization arrangement. In FIG. 12 the web 102' is driven by drive rolls 228, 230 across the printing devices 100'. The web 102' is fed to the drive rolls 228 from a supply roll 232 through feed rolls 234. At the opposite side of the printing devices 100' speed governing rolls 236 control the rate at which the web 102' is wound upon a take-up roll 238. With the slack formed in the web 102' by this arrangement, the linear speed of the web 102' can be controlled precisely since the inertia of the take-up roll 238, as a factor to be regulated, is eliminated.

As an alternative web speed synchronization arrangement, in a system wherein the scanning unit 12 and the printing unit 18 are directly connected, the oscillatory output signal from amplifier 224 may be fed directly to the stepping motors 62, 28 driving the scanning disc 52 and the frame 21, respectively, to coordinate the web speed with the speed at which the miniature marker 14 is scanned.

In another alternative web speed synchronization embodiment in a system wherein storage of signals 90 and 143 on tape is employed, the output from amplifier 224 may be utilized to control the speed of the tape drive in the tape readout device 145.

Whereas one embodiment of the invention has been depicted, other structures may be devised for carrying out the principles of the invention. Such an alternative embodiment may be constructed as illustrated in FIGS. 13 through 18 and described below.

As shown schematically in FIGS. 13 through 17, an electro-optical scanning unit or scanner 12' for scanning the miniaturized marker 14 may include a fluorescent lamp 250 for illuminating an elongated transverse area of the marker 14, a scanning cylinder 252, a mask 254 for defining a very narrow scanned line on marker 14, and optical means 256 for focusing the scanned line on the scanning cylinder 252 and for folding the light path from the mask 254 to the scanning cylinder 252.

The optical means 256 may comprise a set of four 90° prisms 258, 259, 260 and 261 for folding the light paths and a pair of lenses 262, 264 for focusing the scanned line upon the surface of the scanning cylinder 252 (see FIGS. 13 and 14), for reasons to be explained hereinafter. A pair of lenses 262, 264 are used in preference to a single lens for size reduction and cost savings and also because they may have many times greater light gathering efficiency than a single lens. In a preferred arrangement the lenses 262, 264 have a 1:1 magnification and are arranged equidistant from the scanned line and scanning cylinder 252.

Figure 15:
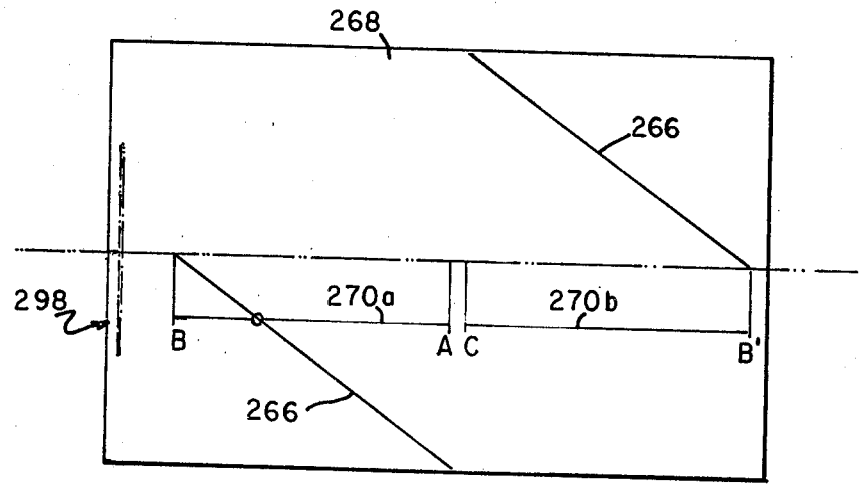
FIG. 15 is a view of a scanning cylinder comprising part of the scanning apparatus of FIGS. 13 and 14, the cylinder being illustrated in sheet form as it would appear before being fabricated into a cylinder.
Figure 16:
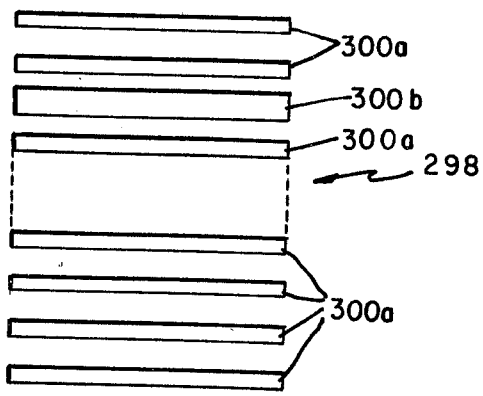
FIG. 16 is an enlarged view of a portion of the cylinder of FIG. 15.

The scanning cylinder 252 is opaque to light except for a transparent scanning line 266 helically circumscribing the cylinder 252. The cylinder 252 may include an external support structure in the form of a section of transparent tubing. The scanning line 266 may be created photographically on a sheet of high resolution film 268, as shown in FIG. 15. Insertion of the film 268 into the cylinder 252 causes the two components of the scanning line 266 to join in a helical pattern around the cylinder 252.

The lenses 262, 264 focus an image 270, comprising component images 270a, 270b (see FIG. 15) of the narrow scanned line upon the cylinder 252 through an axially oriented scanned mask 272. Note that because of the image reversal effects of lenses 262 and 264, a scanned line ABC (not shown) is imaged in two reversed components BA and CB', the end points A and C of the object line ABC being imaged in juxtaposition on cylinder 252.

Figure 13:
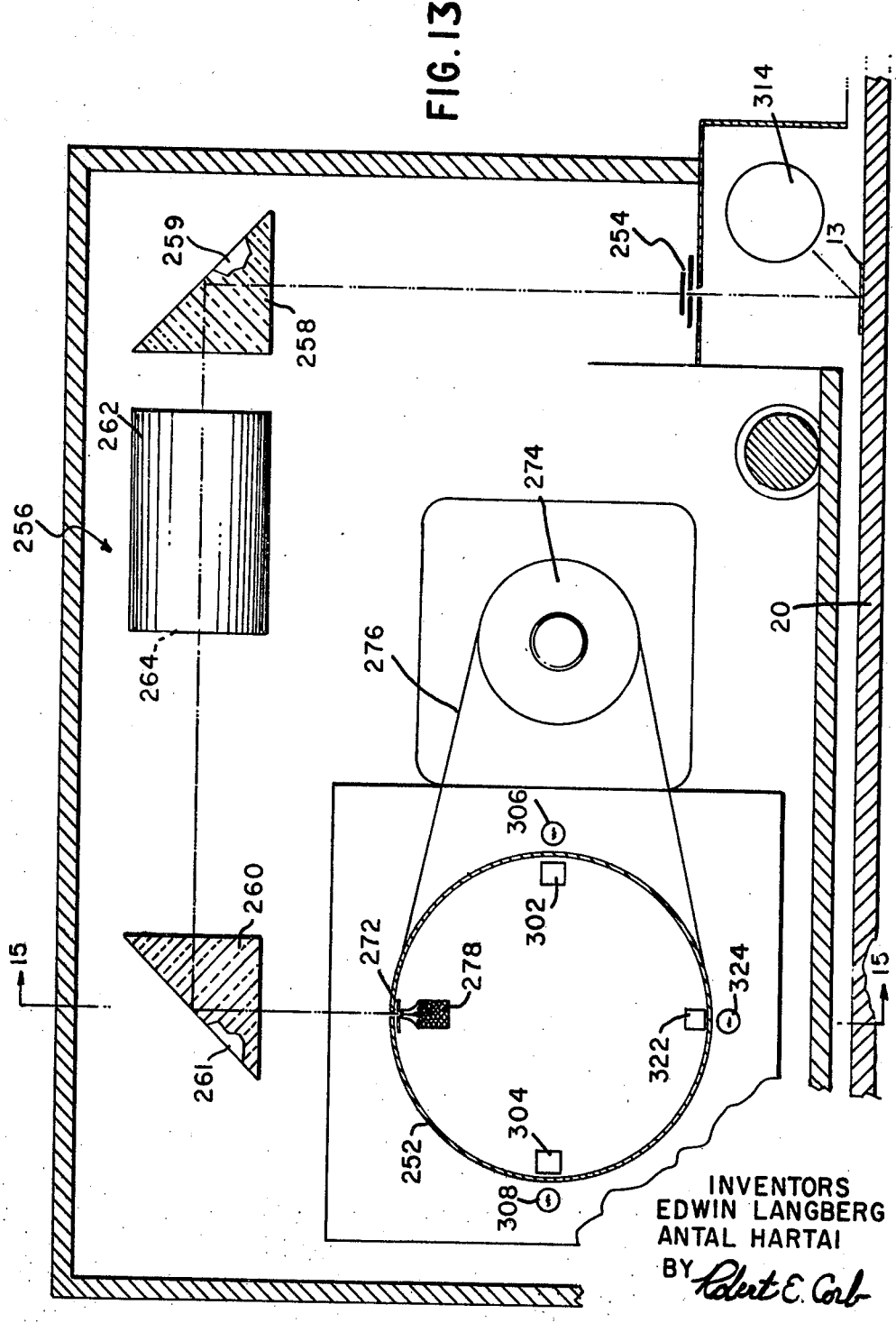
FIG. 13 is a diagrammatic elevational view of another embodiment of electro-optical scanning apparatus constructed in accordance with the invention.

To effect a spot-by-spot scan of the scanned line image 270, the cylinder 252 is rotated, for example (as shown in FIG. 13), by a motor 274 driving the cylinder 252 by means of a transmission belt 276.

In order that the elemental optical information picked up by the above-described optical scanner 12' may be converted into an electrical form, transducing means similar to that described in connection with the FIGS. 1 through 9 embodiment may be employed. Such transducing means is depicted as comprising an optical fiber bundle 278 having fibers arranged in alignment with the scanned mask 272 for transmitting to a photomultiplier tube 280 the elemental optical information picked-up by the optical scanner 12'. It is evident from the drawings and the above description that as the scanner 12' moves across the miniaturized marker 14, the scanned line image 270 formed by lenses 262, 264 is scanned by the moving intersection point of the helical scanning line 266 and the scanned line image 270 and that the instantaneous output of the photomultiplier tube 280 is modulated in accordance with the average intensity of the light reflected from the spot being scanned at that instant. Because of the above-described image reversal effects produced by lenses 264, 266, the scanned line image 270 is scanned by the helical scanning line in sequences in the order A–B, B'–C.

The nature and form of the electrical output signals to be obtained from the above-described electro-optical scanner is governed by the requirements of the printing apparatus employed, and more particularly by the particular distributor employed to distribute print signals to the printing devices (such as those designated by reference numeral 100 in FIG. 6) in accordance with the optical pick-up of the scanner 12'.

In connection with the embodiment of the invention being described, it is preferred to use a distributor in the form of a matrix 282, shown schematically in FIG. 18 and described in detail below.

For use with such a distributing matrix 282, the electrical output from the scanner 12' may be fed into two channels for transmission directly to a printer or for storage on two-channel magnetic tape, as described above in connection with the FIGS. 1 through 9 embodiment of the invention.

One of the two channels (hereinafter designated Channel 1) may contain a frame reset pulse which re-sets the matrix and the print information for controlling the selective energization of the printing devices 100. The other channel (hereinafter designated Channel 2) may carry column advance (Xad) and row advance (Yad) pulses for controlling the advance of the enablement of the columns and rows, respectively, of the print pulse distributing matrix 282, as described in detail below.

Figure 14:
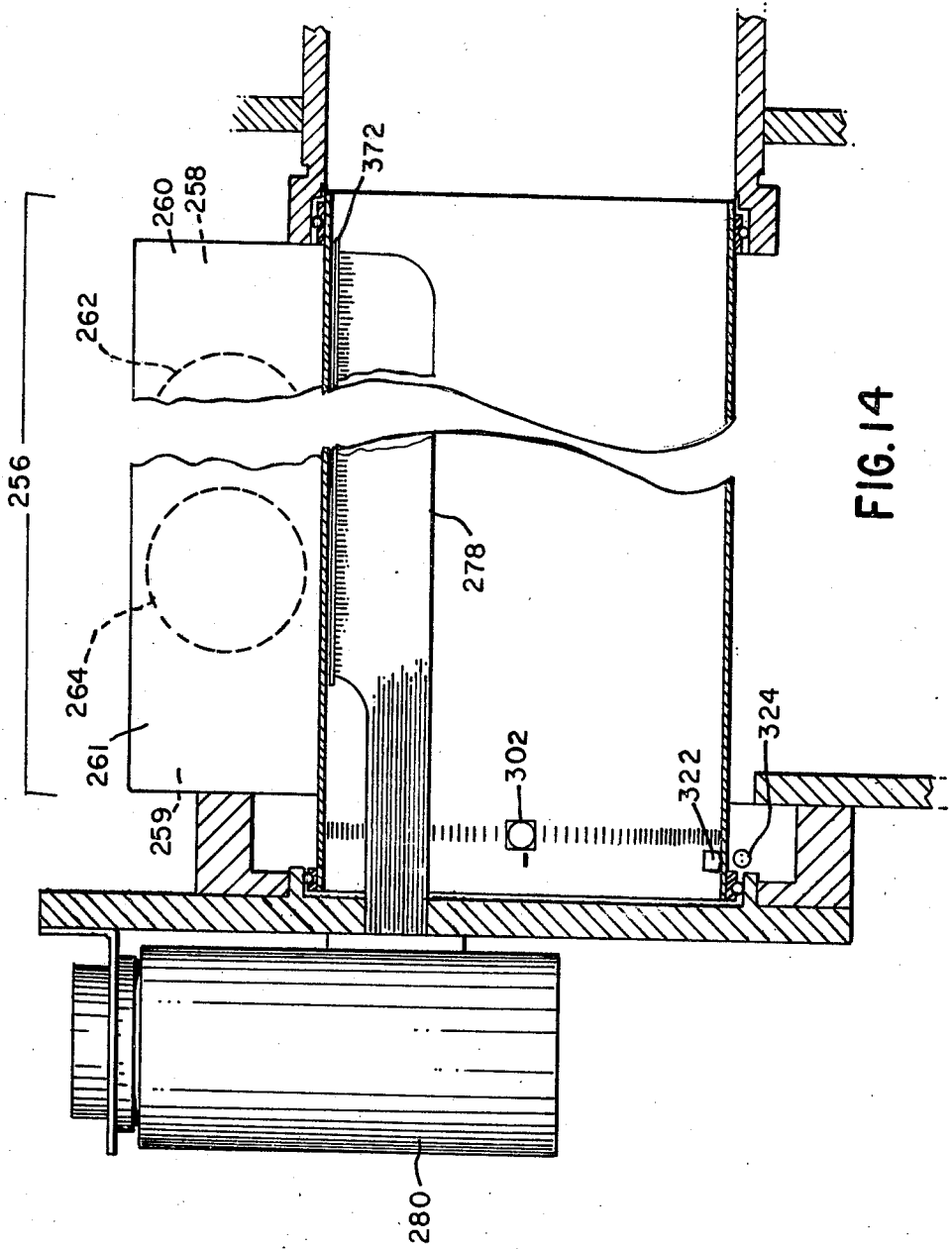
FIG. 14 is a side elevational view of the apparatus of FIG. 13.

Referring to the block diagram of the scanner circuitry in FIG. 17 in connection with FIGS. 14 and 15, the Channel 2 information (column and row advance pulses for the matrix 282) may be generated by an optical encoder having two sequential, 180° spaced pick-up means. The film 268 containing the helical scanning line 266 includes a strip 298 along an end edge thereof coded with transparent areas 300 comprising areas 300a and 300b of different lengths (see FIG. 15). The coded strip 298 preferably has a length corresponding to 180 degrees of rotation of the scanning cylinder 252. For reasons which will become evident, the transparent areas are evenly spaced so as to appear periodically when the cylinder 252 is rotated.

The information encoded on the strip 298 may be picked off by diametrically opposed photodiodes 302, 304 disposed on a corresponding side of film 268 in registration with strip 298 for receiving light from lamps 306, 308, respectively. The light received by the photodiodes 302, 304 is intensity modulated in accordance with the optical information carried by strip 298. It is evident that with the described arrangement, the photodiodes 302, 304 are excited alternately and sequentially and never concurrently.

The output from photodiodes 302, 304 is fed to a summing amplifier 310 which produces a continuous train of column advance (Xad) and row advance (Yad) pulses for driving the distributing matrix 282. A readout by separate photodiodes 302, 304 spaced by 180° has the advantage of simple mechanical adjustment for single alignment of the optical position of the two image components, 270a, 270b, of the scanned line.

The pulses developed at the output of the summing amplifier 310 are preferably squared and sharpened in a Schmidt trigger circuit 311, or the like, before being fed to an output amplifier 312. Thus one channel (Channel 2 in the described embodiment) of the output from the scanner may contain width-modulated Xad and Yad pulses for controlling the activation of the distributing matrix 282, as portrayed graphically in FIG. 18b.

Referring again to the block diagram of the scanner circuitry in FIG. 17 in connection with FIGS. 13 and 14, the Channel 1 information (print and frame reset pulses) may be derived as follows. A photosensitive device, such as a phototube 314, or the like (see FIGS. 13), powered from the same high voltage supply 316 which powers the photomultiplier tube 280, receives a continuous optical input from the fluorescent lamp 250 through a mask 315. The instantaneous output of the phototube 314 is compared with that of the tube 280 by a differential amplifier 318 receiving an input from both tubes 280 and 314. When the spot on the miniaturized marker 14 being scanned at a given instant comprises part of a pattern (which in the illustrated embodiment is highly reflective in comparison with its surround) the inputs to the differential amplifier 318 from tubes 280 and 292 are approximately equal and the amplifier 318 generates no output signal. Conversely, when the comparatively dark pattern surround is being scanned, the output from phototube 314 is greater that the comparatively weak signal generated by photomultiplier tube 280 and an output signal is generated by amplifier 318.

The output signal from the differential amplifier 318 controls a conventional gated one-shot pulse device 320 receiving square-wave pulses from the otuput of the Schmidt trigger circuit 311. The one-shot pulse device 320 produces square wave print pulses of uniform width when triggered during the period when any portion of the pattern surround on marker 14 is being scanned. No output is produced by the device 320 at times corresponding to a scan of a pattern. It should be noted that common factors such as variations in the light intensity of lamp 250, variations in the output of in the high voltage supply 294, the effects of temperature variations, and so forth which affect both inputs to the differential amplifier 296 cancel.

The frame reset pulses for resetting the distributing matrix 282 (to be described in detail below) may be generated by a photodiode 322 receiving light pulses from a lamp 324 once per revolution of cylinder 252 through a transparent window 323 in film 268. The output from photodiode 322 is squared and sharpened by a Schmidt trigger circuit 326 before being fed to a summing amplifier 328 serving to add the outputs of the one-shot pulse device 320 and the trigger circuit 326. Thus, as shown in FIG. 18a, the Channel 1 output from the scanner 12' contains frame reset pulses and print pulses for controlling the energization of printing devices 100. As indicated above, all the information necessary for operating the printing unit 18 is contained in the two output channels.

In accordance with this invention, as indicated above, the distributing means for distributing the print information derived by the above-described electro-optical scanner 12' to the printing devices 100 may take the form of a matrix. FIG. 19 diagrammatically depicts such a matrix 282 and decoding means for decoding the input information carried in Channels 1 and 2, which might be read out, for example, from a two-channel magnetic tape or received directly from the scanner 12'.

The understanding and practice of the invention may be aided by the designation of dimensions which may be used in a system as described immediately above. It is convenient to employ 1,024 printing devices 100, in which instance 1,024 print pulses and one frame reset pulse are generated by the scanner 12' during each revolution of scanning cylinder 252 (corresponding to a scan of one line on marker 14). The pulse repetition rate may be 15,637 pulses per second with a pulse interval of 64 microseconds. The Xad and print pulses may be 21.3 microseconds long and the Yad pulses 42.6 microseconds in duration. A dead time of approximately one millisecond would result.

It is desirable that the minimum pulse duration for energization of a solenoid-actuated printing device such as those shown at 100 in FIG. 6, may be as long as one millisecond because of the response time requirements of the devices 100. In a single square matrix, it would not be possible to switch at the frequency required while keeping the pulses long enough to energize the solenoid.

In accordance with one aspect of this invention, in order to provide a sufficiently long energization pulse during which any of the printing devices 100 are actuated, four 16 x 16 matrices, labeled K, L, M, and N in FIG. 19 are employed. As will be described in more detail below, the matrices K, L, M, and N are now offset and are activated such that there is a 16 pulse-interval delay between the activation of the K and L matrices and a delay of 32 and 38 pulse-intervals, respectively, in the activation of the M and N matrices. With such an arrangement, no printing device 100 is energized for less than a time corresponding to 48 pulse-intervals, totaling greater than 3 milliseconds, well within the pulse duration required for energization of the solenoid-actuated devices 100.

Referring especially to FIG. 19, decoding means comprising decoders 334, 336 may be provided for extracting the information encoded in the Channel 1 and Channel 2 signals, respectively. It will be recalled that Channel 1 contains repetitive sequences of one frame reset pulse (to reset the printing unit 18 and matrix 282 to begin a new 1,024 bit sequence) and a maximum of 1,024 print pulses. Channel 2 contains sequence including 16 groups of 63 Xad pulses (for directing the column advance in the matrix 282) spaced by 16 Yad pulses (for directing the row advance in the matrix 282).

The 1,024 printing devices 100 are arranged linearly across web 102 and are grouped in 8 blocks of 128 devices in each block. The circuitry for driving the devices 100 subdivides each block of 128 devices into 16 groups (corresponding to rows in the matrix 282) of 64 devices (corresponding to columns in the matrix 282) in each group. The Xad pulses determine which of the column drivers are actuated; the Yad pulses select the row driver which is actuated at any given time.

Assuming a "black line" scan by the optical scanner 12', decoder 334, including pulse-width discriminating means, produces an output as shown in FIGS. 18a and 18b comprising a 1 microsecond frame pulse and 1,024 inverted 1 microsecond print pulses. Similarly, decoder 336 produces an output, as shown in FIGS. 18e and 18f, comprising 16 groups of 63 inverted Xad pulses and 16 Yad pulses. The print pulse train is shifted in time with respect to the Xad and Yad pulses in order that the print pulses may occur prior to the corresponding Xad and Yad pulses.

The decoded pulse, frame, Xad and Yad information is fed to a 64 bit column decoder 338. The column decoder 338 controls 64 column drivers, designated collectively 340, for sequentially and cumulatively activating the matrix columns in response to the application thereto of Xad pulses. The column decoder 338 includes pulse counting means for producing L, M, and N pulses resembling the Yad pulses but delayed in time by 16, 32, and 48 pulse intervals, respectively. The Yad, L, M, and N pulses are transmitted, along with the frame reset pulses, to 16 bit row decoders 342, 344, 346, and 348, controlling the actuation of row drivers 350, 352, 354, 356 associated with the K, L, M, and N matrices, respectively. The row drivers 350, 352, 354, and 356 act to sequentially and individually activate the matrix rows in response to the application of row advance (Yad) pulses. In a well-known manner, the concurrent activation of intersecting rows and columns complete respective electrical circuits to respectively associated printing devices 100.

Each of the row drivers 350, 352, 354 and 356 can be thought of as driving a part, i.e., one quarter, of a complete row. The L, M, and N pulses generated by column decoder 338 serve to allow the activation of succeeding columns while previously activated columns in other matrices remain in an activated condition. This arrangement insures that the energization pulse for each printing device 100 exceeds the length of the minimum pulse required to energize the solenoid.

By this invention, then, automatic marker production systems have been described with which a full-sized marker can be automatically produced from a miniature marker at high speeds and low cost, and which systems accord in all respects with the other enumerated and obvious objects of the invention.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An automatic marker production system comprising, in combination:
   scanning means for systematically scanning a miniature marker comprising miniature patterns arranged against a contrasting background surround, said miniature patterns and said surround having different light absorptive properties;
   signal generating means responsive to said scanning means for producing an electrical pattern signal modulated in accordance with the outlines of said miniature patterns and an electrical synchronizing signal corresponding to the positions of said outlines; said signal generating means comprising:
      photosensitive means responsive to the average intensity of light from a scanned spot on said miniature marker, having an electrical parameter reaching one amplitude extreme when a pattern is scanned and an opposite amplitude extreme when a pattern surround is scanned; and discriminating means responsive to said parameter for producing a predetermined output only at instantaneous levels of light intensity of the scanned spot within a predetermined range of levels between said amplitude extremes indicating a scan of a boundary between a pattern and its surround;

said discriminating means compromise: rectifier means responsive to said signal from said photoresponsive means for producing a rectified voltage output of a magnitude corresponding to the peak amplitude of said signal;

voltage dividing means connected to said rectifier means for providing first and second reference voltage terminals defining a range of voltages within which said discriminating means produce said predetermined output; and means for applying said signal across a load means and in parallel therewith to said first terminal through a first unidirectionally conductive device connected in a forward polarity and to said second terminal through a second unidirectionally conductive device connected in a reverse polarity, to develop said predetermined output voltage across said load means only at applied signal voltage within said range delimited by said first and second reference voltage terminals and at all applied voltage levels of said signal without said range, shunting said signal around said load means through said unidirectionally conductive devices;

printing means comprising a plurality of printing devices selectively actuable by said electrical signals for producing discrete visible marks on a printing medium;

motive means for effecting relative movement between said printing devices and said printing medium;

distributor means responsive to said signals for effecting a selective, sequential actuation of said printing device in accordance with said pattern and synchronizing signals; and control means for synchronizing the relative motion of said printing means and said printing medium with said synchronizing signal to produce on said printing medium enlarged outlines corresponding to said miniature patterns.

2. An automatic marker production system comprising, in combination:

scanning means for systematically scanning, by lines, a miniature marker comprising miniature patterns arranged against a contrasting background surround;

signal generating means responsive to said scanning means for producing an electrical pattern signal modulated in accordance with the outlines of said miniature patterns and an electrical synchronizing signal corresponding to the positions of said outlines, the frequency of said synchronizing signal being proportional to the line scan frequency of said scanning means;

printing means comprising a plurality of printing devices selectively actuable by said electrical signals for producing discrete visible marks on a printing medium;

motive means for effecting a relative movement between said printing devices and said printing medium, said motive means including drive means for moving said printing medium at a constant drive speed relative to said printing devices;

distributor means responsive to said signals for effecting a selective, sequential actuation of said printing devices in accordance with said pattern and synchronizing signals;

control means for synchronizing the relative motion of said printing means and said printing medium with said synchronizing signal to produce on said printing medium enlarged outlines corresponding to said miniature patterns; and drive synchronizing means for synchronizing said drive speed with the line scan frequency of said scanning means, comprising:

photoresponsive means arranged with respect to said printing medium for receiving light from a strip of periodically recurring high and low light absorptivity areas on a longitudinal edge of said medium in proportion to the instantaneous absorptivity of a portion of said strip, whereby an electrical parameter of said photoresponsive means is varied periodically at a frequency proportional to the speed of movement of said medium to produce a synchronization pulse having a frequency related to said speed of movement of said medium;

speed adjustment means for varying said drive speed to correspond to said line scan frequency, comprising frequency comparator means for comparing the frequencies of such synchronization pulses and for producing an output proportional to the differences between said frequencies; and feedback means for feeding said output to said drive means to effect a correspondence in said compared freqeuncies and in said line scanning frequency with said drive speed.

3. An automatic marker production system comprising, in combination:

scanning means for systematically scanning a miniature marker comprising miniature patterns arranged against a contrasting background surround;

signal generating means responsive to said scanning means for producing an electrical pattern signal modulated in accordance with the outlines of said miniature patterns and an electrical synchronizing signal corresponding to the positions of said outlines;

printing means comprising a plurality of printing devices selectively actuable by said electrical signals for producing discrete visible marks on a printing medium, said printing medium including first and second areas having different light absorptive properties arranged parallel with an edge of said printing medium and with the direction of movement of said printing medium;

motive means for effecting relative movement between said printing devices and said printing medium;

distributor means responsive to said signals for effecting a selective, sequential actuation of said printing devices in accordance with said pattern and synchronizing signals;

control means for synchronizing the relative motion of said printing means and said printing medium with said sychronizing signal to produce on said printing medium enlarged outlines corresponding to said miniature patterns; and means for registering said printing means with respect to said edge of said printing medium comprising:

light-sensitive monitoring means positioned to receive light from the boundary between said areas for producing an output proportional to a deviation to said boundary from a predetermined position relative to said monitoring means and indicative of the direction of said deviation;

carriage means mounting said printing means for transverse movement with respect to said edge and the direction of movement of said printing medium; and means responsive to said output of said monitoring means for moving said carriage, and said printing means, carried thereby with respect to said edge.

(References on following page)

References Cited

UNITED STATES PATENTS

| | | |
|---|---|---|
| 1,860,967 | 5/1932 | Tate ---------------- 178—7.6 |
| 2,501,791 | 3/1950 | Silverman. |
| 3,090,828 | 5/1963 | Bain. |
| 3,092,686 | 6/1963 | Johnson ------------ 178—5.2 |
| 3,318,996 | 5/1967 | Garfield. |
| 3,318,997 | 5/1967 | Camras. |
| 3,375,527 | 3/1968 | Zirbel. |
| 3,423,524 | 1/1969 | Bradford. |

ROBERT L. GRIFFITH, Primary Examiner

J. A. ORSINO, JR., Assistant Examiner

U.S. Cl. X.R.

178—7.6, 7.1, 7.3, 69.5; 346—74